United States Patent [19]

Haeder

[11] 4,241,234
[45] Dec. 23, 1980

[54] CABLE FITTING OF SHRINKABLE MATERIAL WITH A PERMANENT PLASTIC SEALING INSERT

[75] Inventor: Wolfgang Haeder, Eichenau, Fed. Rep. of Germany

[73] Assignee: Siemens Aktiengesellschaft, Berlin & Munich, Fed. Rep. of Germany

[21] Appl. No.: 57,122

[22] Filed: Jul. 11, 1979

[30] Foreign Application Priority Data

Jul. 24, 1978 [DE] Fed. Rep. of Germany ....... 2832485

[51] Int. Cl.³ .......................................... H02G 15/18
[52] U.S. Cl. .................................. 174/92; 174/72 R; 174/DIG. 8
[58] Field of Search .................. 174/77 R, 92, DIG. 8

[56] References Cited

U.S. PATENT DOCUMENTS

| | | | |
|---|---|---|---|
| 3,379,218 | 4/1968 | Conde | 174/DIG. 8 |
| 3,441,662 | 4/1969 | Augenstein et al. | 174/77 R X |
| 3,458,649 | 7/1969 | Channell | 174/77 R X |
| 3,614,298 | 10/1971 | Thompson | 174/92 |
| 4,105,481 | 8/1978 | Lofdahl | 174/DIG. 8 |
| 4,179,319 | 12/1979 | Lofdahl | 174/DIG. 8 |

Primary Examiner—Roy N. Envall, Jr.
Attorney, Agent, or Firm—Hill, Van Santen, Steadman, Chiara & Simpson

[57] ABSTRACT

An improved cable fitting which consists of a material which is shrinkable under the influence of heat and which has at least one sealing area provided with a sealing device including adhesive agents which are also influenced by heat characterized by the sealing device being a permanent plastic sealing member which is disposed between two adhesive layers. The sealing area of the fitting may be a closure area which has a separation plane defined by a pair of flanges and/or may be a socket-like area or opening in which a cable is inserted through. In either instance, the improved sealing device ensures the required mechanical stability through the use of the adhesive layer and the permanent plastic sealing member or insert ensures sealing against humidity.

10 Claims, 2 Drawing Figures

CABLE FITTING OF SHRINKABLE MATERIAL WITH A PERMANENT PLASTIC SEALING INSERT

BACKGROUND OF THE INVENTION

The present invention is directed to a cable fitting which consists of a material which is shrinkable upon the influence of heat has the sealing area for either the introduction of the cable or the separation plane of a closure and is closed by a sealing device which includes an adhesive layer that is effected by the influence of heat.

In cable fitting technology, since a heat shrinking of a material will adapt the material to various conditions or shapes, a material which is shrinkable under the influence of heat is employed among other things for the manufacturing of covering cable sleeves and the like. An example of an embodiment using a heat shrinkable material is described in German Pat. No. 24 41 668.

The sealing area of the cable fitting may be either at a cable introduction socket or entrance or in the separation plane which is formed by the surfaces of the two longitudinally extending flanges which are held in the sealing engagement on a sealing means by a clamp. Either type of sealing area may be provided with a sealing means which is preferably an adhesive which becomes activated upon the influence to heat. However, occasionally difficulties with respect to the sealing will occur because of either an insufficient adhesion of the adhesive layer to a polyethylene material or the sensitivity of the adhesive material to humidity.

SUMMARY OF THE INVENTION

The present invention is directed to providing an improved cable fitting of a heat shrinkable material in which irregularities in the sealing area with respect to the tightness of the seal are avoided and where favorable properties with respect to mechanical stability are to be retained by means of employment of an adhesive layer. The object of the invention is achieved by an improvement in a cable fitting consisting of a material which is shrinkable under the influence of heat, said cable fitting having at least one sealing area provided with sealing means comprising an adhesive agent influenced by heat. The improvement comprises the sealing means being a permanent plastic member being disposed between two adhesive layers.

The essence of the invention is to be seen by the fact that the problems of sealing and mechanical stability in the introduction area of the cable or in the closure area of the cable fitting are separated from one another and that the occurring difficulties can be optimally solved by means of an employment of an individual means adapted to the problem. Thus, the sealing against humidity is achieved by means of a tape-shaped permanent plastic sealing insert or member which is designed as an annular member in the area of the cable introduction and is designed as a longitudinally extending insert in the closure area of the separation plane extending between surfaces of the flanges. The mechanical stability is achieved by means of an adhesive which is arranged as a coating in front of and behind the permanent plastic sealing member or insert. During the shrinking process, the shrink fitting extends into the indroduction area to tightly press against the permanent plastic sealing member and onto the cable and the adhesive layer in front of and behind the sealing means likewise become activated by the means of the heat and connect the cable jacket with the shrink fitting so that a necessary mechanical stability is achieved. Moreover, the inclusion of the permanent plastic sealing member insert between the adhesive layers has the advantage that a flowing-off of the adhesive material is prevented. Even given internal pressures in the cable fitting, the advantages occur since the working surface with regard to the sealing member is reduced. Favorable results can also be likewise produced in the closure area of the cable fitting by means of an arrangement of a permanent plastic sealing member or insert which is disposed between two adhesive layers.

DESCRIPTION OF THE PREFERRED EMBODIMENT

Figure 1:
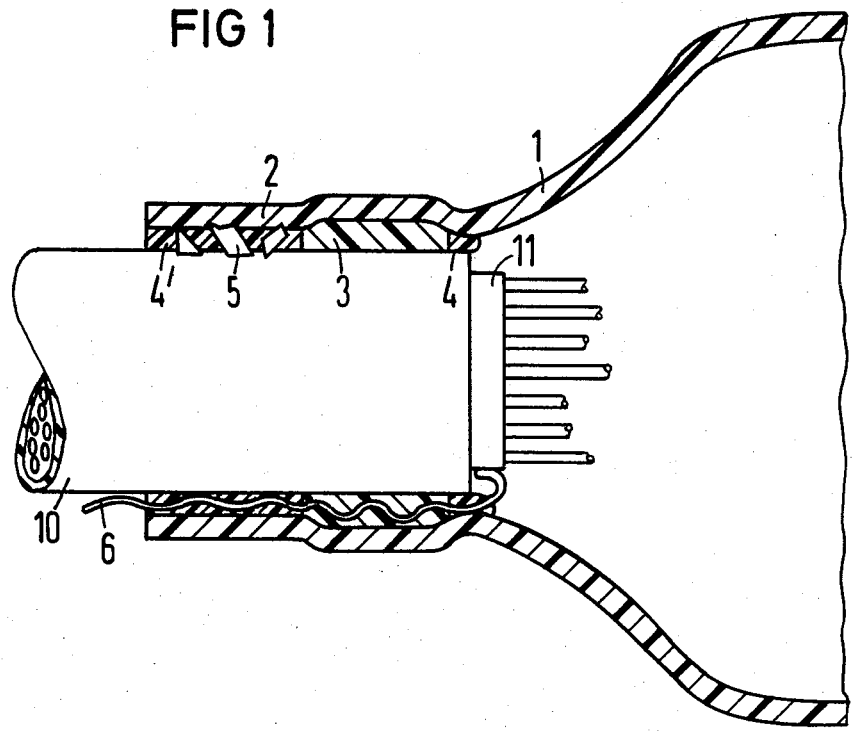
FIG. 1 is a cross-sectional view with portions in elevation for purposes of illustration of an embodiment of the cable fitting in accordance with the present invention.

The principles of the present invention are particularly useful in a cable fitting 1 illustrated in FIG. 1. The cable fitting 1 is of a heat shrinkable material so that it can be shrunk onto a cable jacket 10 of a cable which extends into the cable introduction area or socket. To seal the interior of the cable fitting against humidity, an annular winding of a permanent plastic sealing insert or member 3 is provided between the jacket 10 of the cable and the heat shrinkable cable fitting 1. The required mechanical stability is achieved by means of adhesive layers 4 and 4' which are arranged on both ends of the annular member 3. The adhesive layers 4 and 4' will connect the interior surfaces of the heat shrink fitting with the cable jacket 10 so that irregularities that would lead to a lack of a seal are no longer present and the sealing against humidity is ensured by means of the plastic sealing member 3.

In the illustrated embodiments, a granular material 5 is embedded in the outer adhesive layer 4' in order to increase the resistance of the adhesive layer 4' against tensile strength and pressure forces. In addition, the embodiment illustrates the presence of a connecting band or link 6 which may act as a lead-in wire. The connecting band or link 6 has a corrugation and is provided to extend through the adhesive layers 4 and 4' as well as through the sealing member 3. As illustrated, the band or link 6 forms an external connection that extends through the sealing means to the cable sheath 11 in the interior of the fitting 1.

Figure 2:
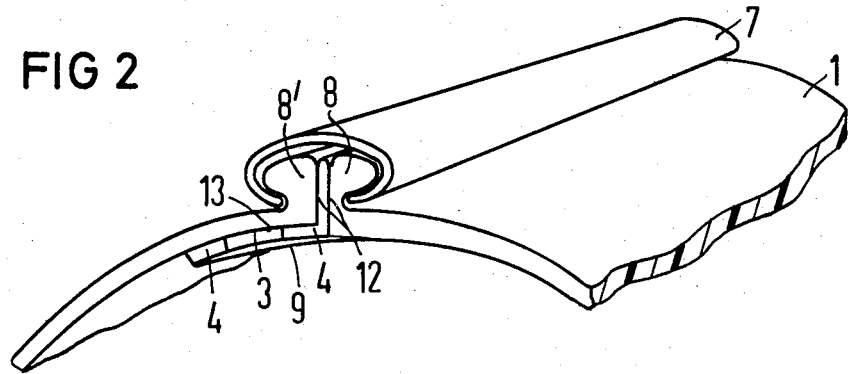
FIG. 2 is a partial perspective view of an embodiment of the sealing member of the present invention.

FIG. 2 illustrates a longitudinal closure of a shrinkable cable fitting 1. The closure is formed by two longitudinally extending beads or flanges 8 and 8' have facing surfaces 12, which form a separation plane. The two surfaces 12 are held together and in engagement with the sealing means by a clamp 7 that engages the outer portion of the flanges 8 and 8'. The sealing means, as in the previous embodiment, includes the permanent plastic sealing member or insert 3 disposed between two adhesive layers 4.

In the embodiment illustrated in FIG. 2, a flap 9, which is a continuation of an internal surface adjacent one of the flanges 8 overlaps a portion 13 of the internal surface of the fitting adjacent the other flange 8'. The sealing means in addition to extending between the surfaces 12 of the flanges 8 which surfaces 12 form the separation plane also extend between the portion 13 and the flap 9. The adhesive layers 4 again provide the good mechanical stability whereas the permanent sealing insert or member 3 assures the creation of the seal. While the embodiment shows the sealing means extend between both the surfaces 12 and the adjacent portion 13 which is overlapped by the flap 9, the entire sealing means can be disposed in the sealing or separation plane formed by the surfaces 12 of the beads or flanges 8.

An example of an adhesive material used in the layer 4 is a polyamide adhesive. An example of the material used for the sealing member 3 is a compound of polyisobutylene and carbon.

In the two illustrated embodiments of FIGS. 1 and 2, the sealing means is illustrated for a sealing area that is a socket or opening for receiving a cable as shown in FIG. 1 and for sealing area that is a separation plane of the longitudinal closure is shown in FIG. 2. The fitting in accordance with the present invention could be provided with either of these two types of sealing areas or with both types of sealing areas as desired.

Although various minor modifications may be suggested by those versed in the art, it should be understood that I wish to embody within the scope of the patent granted hereon, all such modifications as reasonably and properly come within the scope of my contribution to the art.

I claim:

1. In a cable fitting consisting of a material which is shrinkable under the influence of heat, said cable fitting having at least one sealing area provided with sealing means comprising an adhesive agent influenced by heat the improvement comprising said sealing means being a permanent plastic sealing member being disposed between two adhesive layers.

2. In a cable fitting according to claim 1, wherein the sealing means includes a connecting link extending through the adhesive layers and the plastic sealing member.

3. In a cable fitting according to claim 1, wherein at least one of the adhesive layers has a granular material embedded therein.

4. In a cable fitting according to claim 3, wherein said sealing means includes a connecting band extending through the adhesive layers and the plastic sealing member.

5. In a cable fitting according to claim 1, wherein the sealing area is formed by two flange members forming a separation plane having sealing surfaces with a clamping element holding the flange members in sealing engagement on said sealing means, said sealing means being disposed as a band between said sealing surfaces of the separation plane.

6. In a cable fitting according to claim 5, wherein one of said flanges has a flap extending over a portion of the surface adjacent the sealing surface of the separation plane of the other flange, and said sealing means comprising the sealing member and two adhesive layers extending between the sealing surfaces of the flanges and into the space between the flap and the portion of the surface covered by said flap.

7. In a cable fitting according to claim 1, wherein the sealing area is a socket-like area through which the cable passes, said sealing means being disposed in said socket-like area surrounding a cable inserted therein.

8. In a cable fitting according to claim 7, wherein the cable fitting also includes a sealing area comprising a pair of molded flange elements having sealing surfaces forming a separation plane, a sealing means being disposed between said sealing surfaces of said separation plane.

9. In a cable fitting according to claim 7, wherein at least one of said adhesive layers includes a granular material embedded therein.

10. In a cable fitting according to claim 7, wherein the sealing means further includes a connecting link extending through the adhesive layers and the sealing member to enable forming a connection between the interior of the fitting and the exterior thereof.

* * * * *